United States Patent
Katayama et al.

(10) Patent No.: US 11,659,431 B2
(45) Date of Patent: May 23, 2023

(54) TRAFFIC CONTROL METHOD, RECEIVER, AND COMMUNICATION SYSTEM

(71) Applicant: Hitachi, Ltd., Tokyo (JP)

(72) Inventors: Rintaro Katayama, Tokyo (JP); Daisuke Ishii, Tokyo (JP); Ryosuke Fujiwara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/326,013

(22) Filed: May 20, 2021

(65) Prior Publication Data

US 2021/0377777 A1 Dec. 2, 2021

(30) Foreign Application Priority Data

Jun. 1, 2020 (JP) .............................. JP2020-095786

(51) Int. Cl.
*H04W 28/02* (2009.01)
*H04W 4/40* (2018.01)
*H04L 47/2425* (2022.01)

(52) U.S. Cl.
CPC ..... *H04W 28/0236* (2013.01); *H04L 47/2433* (2013.01); *H04W 4/40* (2018.02); *H04W 28/0273* (2013.01)

(58) Field of Classification Search
CPC ............... H04W 4/40; H04W 28/0236; H04W 28/0273; H04L 47/2433
See application file for complete search history.

(56) References Cited

U.S. PATENT DOCUMENTS

| | | | | |
|---|---|---|---|---|
| 2011/0292800 | A1* | 12/2011 | Flinta | ..................... H04L 47/28 370/235 |
| 2012/0320924 | A1* | 12/2012 | Baliga | ..................... H04L 45/70 370/400 |
| 2014/0254543 | A1* | 9/2014 | Engelhard | ........... H04W 64/006 370/329 |
| 2019/0253948 | A1 | 8/2019 | Nagura et al. | |
| 2019/0364492 | A1* | 11/2019 | Azizi | .................... H04W 4/029 |
| 2020/0128495 | A1* | 4/2020 | Schwent | ............. H04W 52/386 |
| 2020/0357278 | A1 | 11/2020 | Fujii | |

FOREIGN PATENT DOCUMENTS

| | | |
|---|---|---|
| JP | 2011-176693 A | 9/2011 |
| WO | 2019155599 A1 | 8/2019 |

OTHER PUBLICATIONS

Extended European Search Report dated Sep. 24, 2021 from counterpart EP Patent Application No. 21174004.8, 12 pages.

\* cited by examiner

*Primary Examiner* — Brian P Cox
(74) *Attorney, Agent, or Firm* — Procopio, Cory, Hargreaves & Savitch LLP

(57) ABSTRACT

A receiver mounted on a vehicle moving on a route manages an operation profile that stores data in which a section that is a part of the route and a communication quality in the section are associated, and can receive a first traffic and a second traffic having a lower priority than the first traffic. The receiver determines a section having a good communication quality to a transmission section where the second traffic can be transmitted with reference to the operation profile, and generates control information for controlling transmission of the second traffic not to hinder transmission of the first traffic when the vehicle is located in the transmission section.

14 Claims, 10 Drawing Sheets

FIG. 4

| ID (401) | TIME (402) | STATE (403) | PLACE (404) | COMMUNICATION QUALITY [dBm] (405) |
|---|---|---|---|---|
| 0 | 08:00:00–08:01:00 | STOP | A (STATION) | −105 |
| 1 | 08:01:00–08:02:00 | TRAVELING | B | −113 |
| 2 | 08:02:00–08:03:00 | TRAVELING | C | −110 |
| 3 | 08:03:00–08:04:00 | TRAVELING | D | −98 |
| 4 | 08:04:00–08:05:00 | STOP | E (STATION) | −76 |
| 5 | 08:05:00–08:06:00 | TRAVELING | F | −70 |
| 6 | 08:06:00–08:07:00 | TRAVELING | G | −80 |
| 7 | 08:07:00–08:08:00 | TRAVELING | H | −78 |
| 8 | 08:08:00–08:09:00 | STOP | I (STATION) | −75 |
| 9 | 08:09:00–08:10:00 | TRAVELING | J | −88 |
| 10 | 08:10:00–08:11:00 | TRAVELING | K | −100 |
| 11 | 08:11:00–08:12:00 | TRAVELING | VEHICLE DEPOT | −90 |
| 12 | 08:12:00–08:13:00 | STOP | VEHICLE DEPOT | −84 |

| TRANSMISSION SOURCE | PRIORITY |
|---|---|
| 192.168.10.1 | NON-PREFERRED |
| 192.168.10.10 | PREFERRED |

FIG. 6

| ID | TRANSMISSION SECTION FLAG |
|---|---|
| 0 | 0 |
| 1 | 0 |
| 2 | 0 |
| 3 | 0 |
| 4 | 1 |
| 5 | 1 |
| 6 | 1 |
| 7 | 1 |
| 8 | 1 |
| 9 | 0 |
| 10 | 0 |
| 11 | 0 |
| 12 | 0 |

FIG. 7

| PRIORITY | UPPER LIMIT RATE [Mbps] | EXPIRATION DATE |
|---|---|---|
| NON-PREFERRED | 10 | 09:10:30 |

TRAFFIC CONTROL METHOD, RECEIVER, AND COMMUNICATION SYSTEM

CLAIM OF PRIORITY

The present application claims priority from Japanese patent application JP 2020-095786 filed on Jun. 1, 2020, the content of which is hereby incorporated by reference into this application.

BACKGROUND OF THE INVENTION

1. Field of the Invention

The present invention relates to communication traffic control.

2. Description of the Related Art

With the progress of computerization of vehicles such as railroad vehicles and automobiles, information contents are distributed to the vehicles via networks. In addition, there is an increasing momentum for OTA (Over The Air) to distribute software for vehicle equipment that has been performed using maintenance PCs at maintenance shops and the like. In this case, communication traffic of different types, such as communication traffic for content distribution and communication traffic for software distribution, is transmitted via the network. Linguistically, the following specification and the claims and figures address "communication traffic" as "traffic".

The technique described in JP 2011-176693 A is known as a technique for controlling the transmission of a plurality of types of traffic. JP 2011-176693 A discloses "A TCP flow control device is provided in a mobile device that performs wireless communication with a base station and performs TCP communication with an IP communication device on a network via the base station. A TCP link monitor monitors the flow of a plurality of TCP links used for TCP communication between the IP communication device on the network and the IP communication device provided in a mobile device 20, and measures the traffic volume for each TCP link. The TCP flow control unit specifies each TCP link in the plurality of TCP links as either a TCP link for preferred traffic or a TCP link for non-preferred traffic, and suppresses the traffic volume of the TCP link for the non-preferred traffic when a ratio of the traffic volume of the preferred traffic to the total traffic volume exceeds a predetermined threshold".

SUMMARY OF THE INVENTION

When the plurality of types of traffic are transmitted over the network, the transmission of one traffic may be hindered by the transmission of the other traffic. For example, when the traffic for software distribution is transmitted while the traffic for content distribution having a large capacity is transmitted, the bandwidth of the traffic for content distribution may be suppressed.

In addition, even when the communication quality is good and sufficient throughput can be obtained and the traffic for content distribution and software distribution can coexist, the bandwidth of the traffic for content distribution may be suppressed by the decrease in throughput due to the movement of the vehicle.

If the bandwidth of the traffic for content distribution is suppressed, it may not be possible to obtain the information required by the vehicle due to the delay in receiving the traffic. For example, due to a delay in receiving traffic for content distribution, information acquisition may not be in time for content display timing. Therefore, as described in JP 2011-176693 A, there is a possibility that the traffic volume of the TCP link for preferred traffic cannot be sufficiently secured only by suppressing the traffic volume of the TCP link for non-preferred traffic.

The invention realizes traffic control that does not hinder the transmission of high-priority traffic in a communication environment in which a vehicle can receive a plurality of types of traffic.

A representative example of the invention disclosed in the application is as follows. That is, a traffic control method is executed by a receiver that is mounted in a vehicle moving on an arbitrary route and can receive a plurality of types of traffic having different priorities. The receiver is configured to include an arithmetic device, a storage device connected to the arithmetic device, and a network interface connected to the arithmetic device, and manage an operation profile that stores data in which a section that is a part of the route and a communication quality in the section are associated. A first traffic and a second traffic having a lower priority than the first traffic can be received. The traffic control method includes determining, by the receiver referring the operation profile, the section having a good communication quality to a transmission section in which the second traffic can be transmitted, and executing a traffic restriction determination process in which the receiver generates control information for controlling transmission of the second traffic. The traffic restriction determination process includes generating, by the receiver, the control information for controlling transmission of the second traffic not to hinder transmission of the first traffic when the vehicle is located in the transmission section.

According to the invention, in a communication environment in which a vehicle can receive a plurality of types of traffic, it is possible to realize traffic control in which transmission of high-priority traffic is not hindered. Objects, configurations, and effects besides the above description will be apparent through the explanation on the following embodiments.

BRIEF DESCRIPTION OF THE DRAWINGS

FIG. 4 is a diagram illustrating an example of a data structure of an operation profile of the first embodiment;

FIG. 5 is a diagram illustrating an example of a data structure of policy management information of the first embodiment;

FIG. 6 is a diagram illustrating an example of a data structure of transmission section information of the first embodiment;

FIG. 7 is a diagram illustrating an example of a data structure of traffic control information of the first embodiment;

DESCRIPTION OF THE PREFERRED EMBODIMENTS

Figure 1:
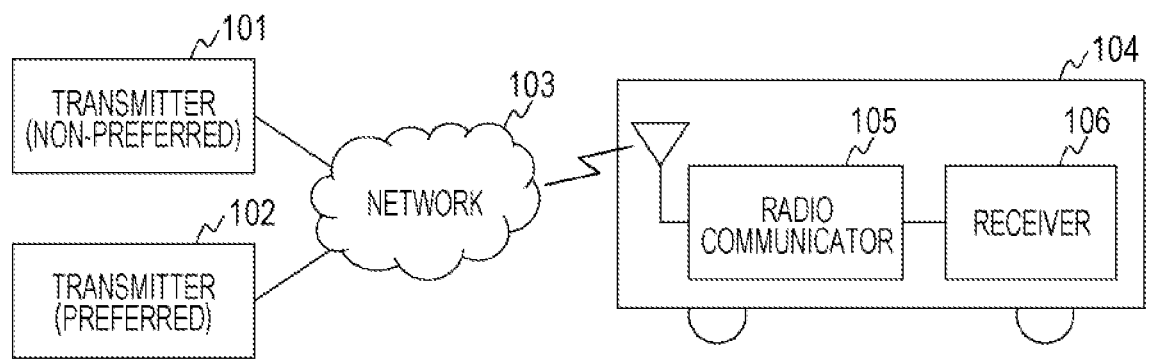
FIG. 1 is a diagram illustrating an example of the configuration of a traffic control system according to a first embodiment.

Hereinafter, embodiments of the invention will be described using the drawings. However, the invention is not interpreted in a limited way to the following embodiments. A person skilled in the art can easily understand that the specific configurations may be changed within a scope not departing from the ideas and the spirit of the invention. The configurations or functions which are identical or similar below in the invention will be attached with the same symbols, and the redundant description will be omitted. The notations of "first", "second", "third" and the like in the present specification are attached in order to identify the components, but not necessarily used to indicate the number or the order. The position, size, shape, range, and the like of each configuration illustrated in the drawings may not necessarily represent the actual position, size, shape, range, and the like, in order to facilitate understanding of the invention. Therefore, the invention is not limited to the position, size, shape, range, and the like disclosed in the drawings and the like.

First Embodiment

In a first embodiment, traffic distribution to a railroad vehicle will be described as an example. However, the invention can also be applied to traffic distribution in other vehicles such as automobiles. In the first embodiment, two types of traffic priority, "preferred" and "non-preferred", are set. However, the traffic priority may have three or more types. In the first embodiment, each transmitter transmits one type of traffic having different priorities, but one transmitter may transmit a plurality of traffic having different priorities.

FIG. 1 is a diagram illustrating an example of the configuration of a traffic control system of the first embodiment.

The traffic control system consists of transmitters 101 and 102, a network 103, and a vehicle 104. The transmitters 101 and 102 are connected to the vehicle 104 via the network 103. The network 103 is composed of one or more base stations and one or more core network devices, and includes, for example, a WAN (Wide Area Network), a LAN (Local Area Network), the Internet, and the like. It is assumed that the connection method of the network 103 is wireless. However, the connection method of the network 103 may be wired.

The transmitter 101 and the transmitter 102 transmit different types of traffic. It is assumed that the priority of the traffic transmitted by the transmitter 101 is lower than the priority of the traffic transmitted by the transmitter 102. In the present specification, the priority of the traffic transmitted by the transmitter 101 is defined as "non-preferred", and the priority of the traffic transmitted by the transmitter 102 is defined as "preferred".

The vehicle 104 moves on an arbitrary route (railroad track). The vehicle 104 has a radio communicator 105 and a receiver 106. The vehicle 104 has hardware other than the radio communicator 105 and the receiver 106, such as a drive device, a camera, and a sensor, but is omitted for the sake of simplicity. Further, although the vehicle 104 has a control unit that controls the entire vehicle 104, it is omitted for the sake of simplicity.

The radio communicator 105 connects the network 103 and the receiver 106, and communicates with the transmitters 101 and 102. The radio communicator 105 includes a network interface that connects to the network 103 and an interface that connects to the receiver 106. The radio communicator 105 and the receiver 106 are connected directly or via a network. The network connection method for connecting the radio communicator 105 and the receiver 106 may be either wired or wireless.

The traffic transmitted by the transmitters 101 and 102 is received by the receiver 106 via the network 103 and the radio communicator 105.

Figure 2:
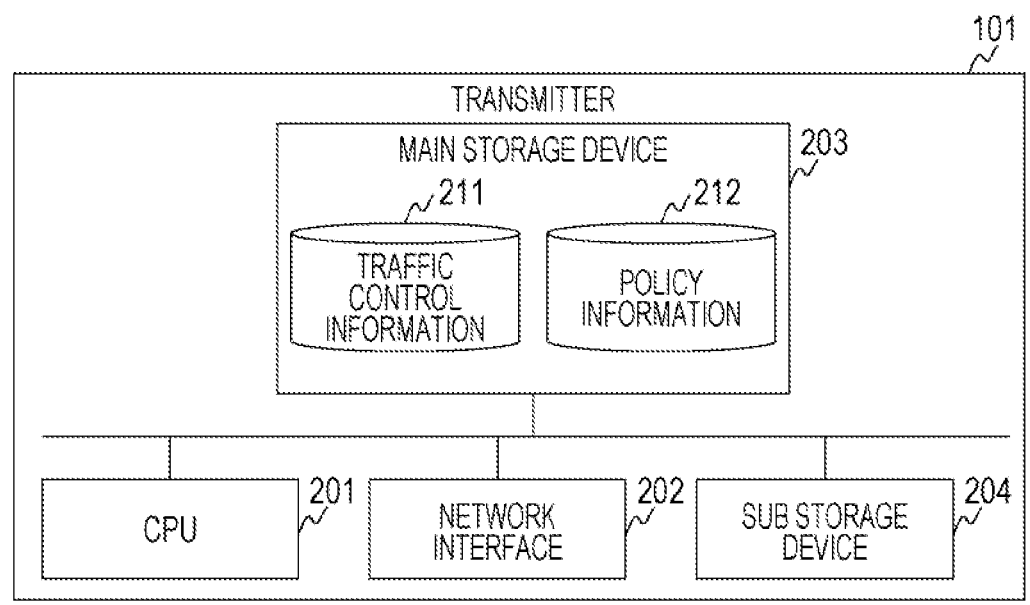
FIG. 2 is a diagram illustrating an example of the configuration of a transmitter of the first embodiment.

FIG. 2 is a diagram illustrating an example of the configuration of the transmitter 101 of the first embodiment.

The transmitter 101 includes a CPU 201, a network interface 202, a main storage device 203, and a sub storage device 204. The transmitter 101 may have an input/output interface for connecting to an input device and an output device. The input device includes a keyboard, a mouse, a touch panel, and the like, and the output device includes a display, a printer, and the like.

The CPU 201 executes various arithmetic processes. The CPU 201 executes a program stored in the main storage device 203 to operate as a functional unit (module) for realizing a specific function.

In the present specification, the expressions such as "process or instruction of the transmitter 101" mean the process executed by the CPU 201 of the transmitter 101 according to the program.

The network interface 202 is an interface to communicate with external devices through the network.

The main storage device 203 is a storage device such as a DRAM (Dynamic Random Access Memory), and stores a program executed by the CPU 201 and information used by the program. The main storage device 203 is also used as a work area temporarily used by the program.

The sub storage device 204 is a storage device for permanently storing data of a Hard Disk Drive (HDD) and a Solid State Drive (SSD), and the like. The programs and information stored in the main storage device 203 may be stored in the sub storage device 204. In this case, the CPU 201 reads the program and information from the sub storage device 204 and loads the program and information into the main storage device 203.

The main storage device 203 stores traffic control information 211 and policy information 212, and also stores a program for realizing a functional unit (for example, a transmission/reception control unit) that controls the transmission and the like of traffic (not illustrated).

The traffic control information 211 is information transmitted from the receiver 106, and stores parameters and the like for executing traffic control. The policy information 212 stores a value indicating the priority of traffic.

The hardware configuration of the transmitter 102 is the same as that of the transmitter 101. The software configuration of the transmitter 102 differs from the software configuration of the transmitter 101 in that it does not include the traffic control information 211.

Figure 3:
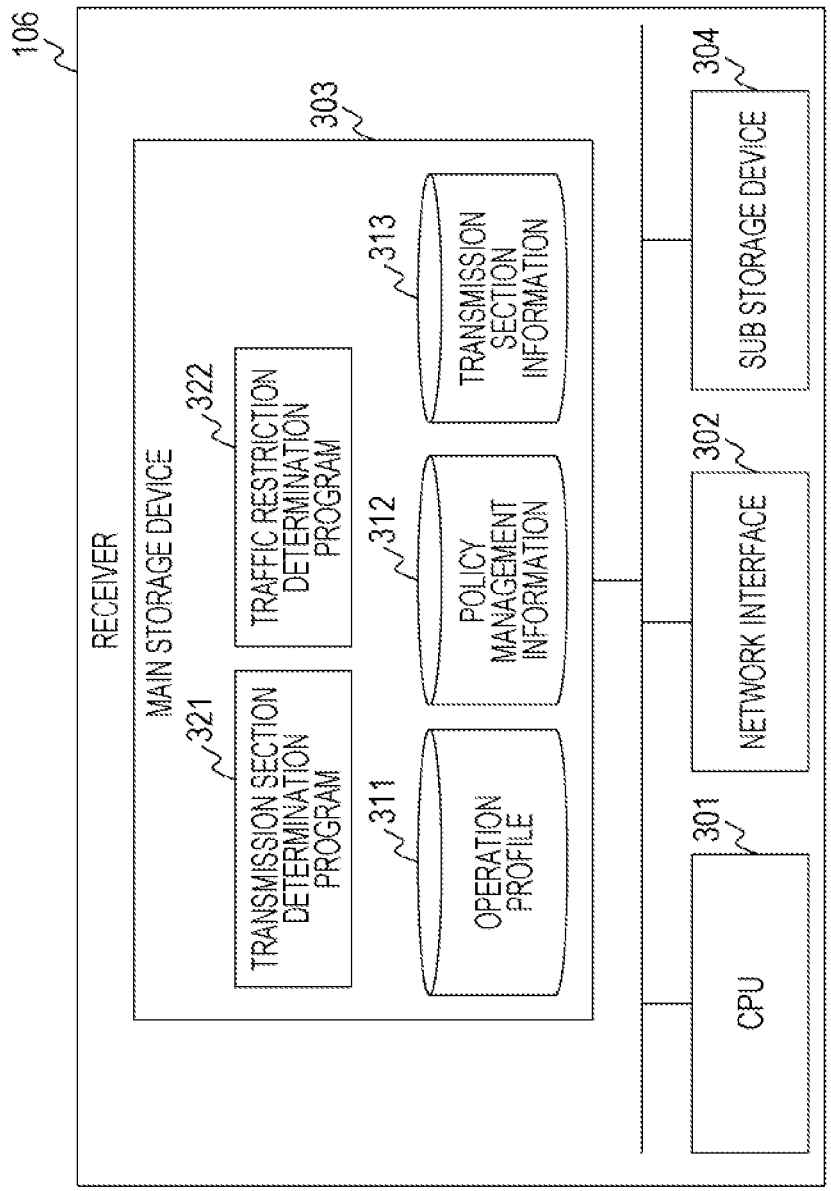
FIG. 3 is a diagram illustrating an example of the configuration of a receiver of the first embodiment.

FIG. 3 is a diagram illustrating an example of the configuration of the receiver 106 of the first embodiment.

The receiver 106 includes a CPU 301, a network interface 302, a main storage device 303, and a sub storage device 304. The receiver 106 may have an input/output interface for connecting to an input device and an output device.

The CPU 301, the network interface 302, the main storage device 303, and the sub storage device 304 have the same hardware as the CPU 201, the network interface 202, the main storage device 203, and the sub storage device 204.

In the present specification, the expressions such as "process or instruction of the receiver 106" mean the process executed by the CPU 301 of the receiver 106 according to the program.

The main storage device 303 stores an operation profile 311, policy management information 312, transmission section information 313, a transmission section determination program 321, and a traffic restriction determination program 322. The structure of each information and the details of the processing executed by the program will be described later.

FIG. 4 is a diagram illustrating an example of the data structure of the operation profile 311 of the first embodiment.

The operation profile 311 stores an entry consisting of an ID 401, a time 402, an operation state 403, a location 404, and a communication quality 405. There is one entry for one section that is part of the route.

The ID 401 is a field to store the identification information of the section.

The time 402 is a field that stores a time range. The time range is an example of information that identifies a section.

The operation state 403 stores a value indicating the operation state of the vehicle 104 in the section. Specifically, either "traveling" or "stopping" is stored in the operation state 403.

The location 404 is a field that stores location information. For example, the name of the road, the name of the building, the GPS value, and the like are stored. The location information is an example of information for specifying a section.

The communication quality 405 stores information indicating the quality of wireless communication when the vehicle 104 is located in the section. The communication quality 405 stores the average value of the communication quality in the section. As values representing the communication quality, for example, RSRP (Reference Signal Received Power) and CQI (Channel Quality Indicator) can be considered. In this embodiment, the average value of RSRP in the section is stored in the communication quality 405.

The operation profile 311 illustrated in FIG. 4 includes both the time range and the location information as the information for specifying the section, but may include only one of them.

In addition, either the time range or the location information may be used as the information for specifying the section. For example, when the time range is used as information for specifying a section, the location 404 is treated as information indicating the position of the vehicle 104 in the time range corresponding to the section. When the location information is used as the information for specifying the section, the time 402 is treated as the information indicating the time range in which the vehicle 104 exists at the position corresponding to the section.

FIG. 5 is a diagram illustrating an example of the data structure of the policy management information 312 of the first embodiment.

The policy management information 312 stores an entry composed of a transmission source 501 and a priority 502. There is one entry for one policy information 212.

The transmission source 501 is a field that stores information for identifying the transmitter that sends traffic. The IP address of the transmitter is stored in the transmission source 501 of this embodiment.

The priority 502 is a field that stores information indicating the priority of traffic. Either "preferred" or "non-preferred" is stored in the priority 502 of this embodiment. When there are three or more types of traffic priorities, a numerical value or the like indicating the priority is stored in the priority 502.

FIG. 6 is a diagram illustrating an example of a data structure of the transmission section information 313 of the first embodiment.

The transmission section information 313 stores an entry composed of an ID 601 and a transmission section flag 602. There is one entry for one section. The ID 601 is the same field as the ID 401.

The transmission section flag 602 is a field for storing a value indicating whether or not the section corresponding to the ID 601 is a transmission section in which transmission of traffic having a priority of "non-preferred" is permitted. If it corresponds to the transmission section, "1" is stored in the transmission section flag 602, and if it does not correspond to the transmission section, "0" is stored in the transmission section flag 602.

The transmission section information 313 illustrated in FIG. 6 indicates that each section of the ID 601 from "4" to "8" is set as a transmission section.

FIG. 7 is a diagram illustrating an example of a data structure of the traffic control information 211 of the first embodiment.

The traffic control information 211 is composed of a priority 701, an upper limit rate 702, and an expiration date 703.

The priority 701 is a field that stores information indicating the priority of the traffic to be controlled. The upper limit rate 702 is a field that stores the upper limit rate for the traffic to be controlled. The expiration date 703 is a field that stores the expiration date of the traffic control information 211.

Note that the traffic control information 211 does not have to include the expiration date 703.

The traffic control information 211 illustrated in FIG. 7 is an example and is not limited to this. Any information may be used as long as it stores parameters and the like required for traffic control.

Figure 8:
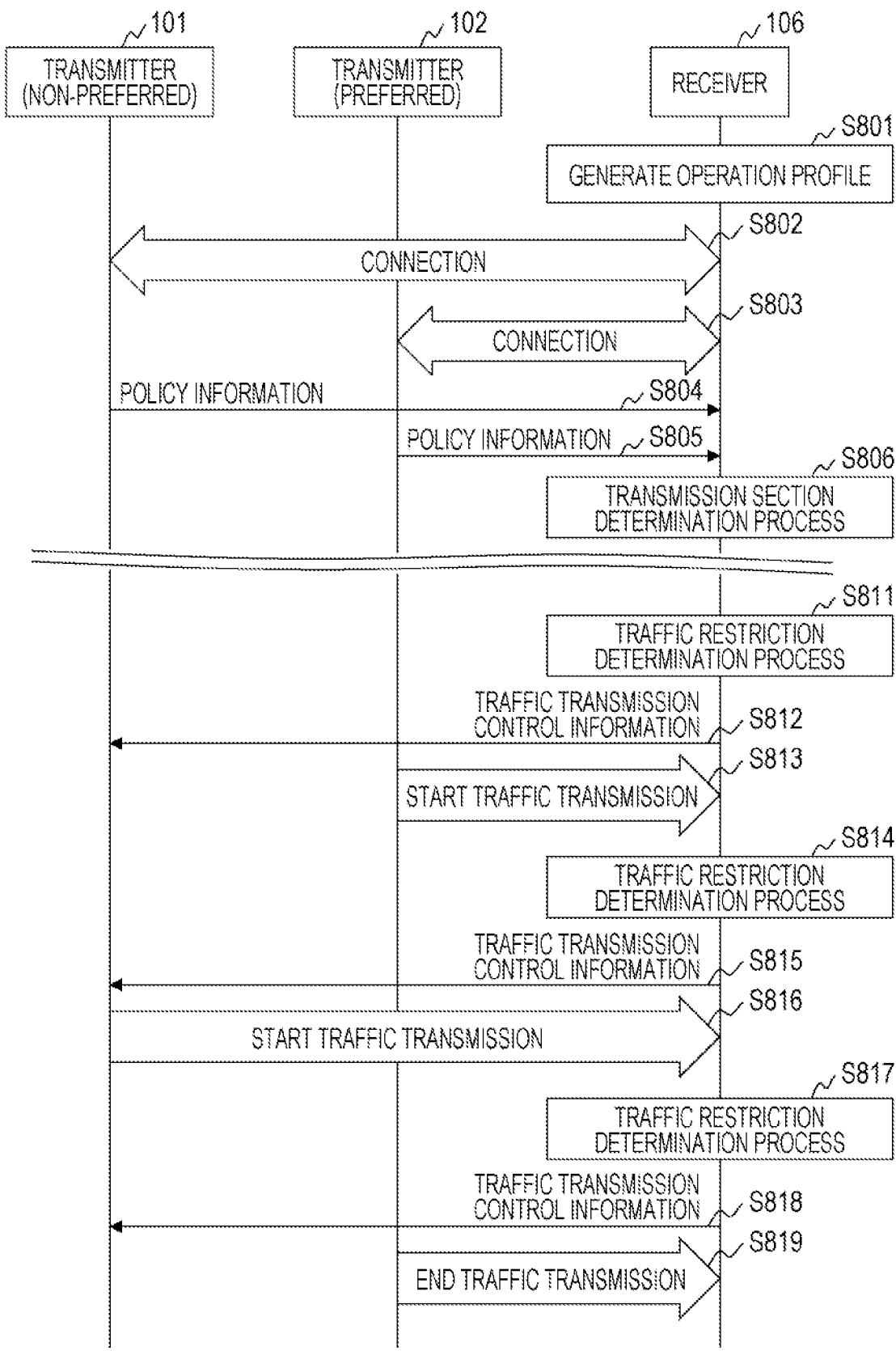
FIG. 8 is a sequence diagram for explaining a processing flow in the traffic control system of the first embodiment.

FIG. 8 is a sequence diagram for explaining a processing flow in the traffic control system of the first embodiment.

The receiver 106 generates the operation profile 311 (Step S801).

Specifically, the receiver 106 generates the operation profile 311 by acquiring the operation state and communication quality of the vehicle 104 in one day. Then, the operation profile 311 is used in the transmission section determination process, the traffic restriction determination process, and the like.

The operation information can be obtained from the control unit, sensors, and the like. The communication quality is measured by the radio communicator 105. At this time, the communication quality may be measured using the test traffic.

The receiver 106 may acquire the operation state and the communication quality for a plurality of days, and generate the operation profile 311 using the measurement results of each day. For example, the receiver 106 calculates an average value using RSRP of each day in a certain section, and sets the average value as the communication quality of the section. In addition, the receiver 106 may generate an operation profile 311 for each day of the week. In this case, the receiver 106 executes the transmission section determination process, the traffic restriction determination process, and the like using the operation profile 311 corresponding to the current day of the week.

The receiver 106 generates the operation profile 311 at a fixed cycle, for example, every other day.

Although the receiver 106 generates the operation profile 311 before connecting to the transmitters 101 and 102, the operation profile 311 may be generated after connecting to the transmitters 101 and 102.

The operation profile 311 may be not generated by the receiver 106. In this case, the operation profile 311 generated by simulation, user input, or the like is input to the receiver 106.

The receiver 106 is then connected to the transmitters 101 and 102 (Steps S802 and S803).

The transmitters 101 and 102 transmit the policy information to the receiver 106, respectively (Steps S804 and S805).

When one transmitter manages the traffic priority of the other transmitter, only the transmitter may transmit the policy information.

Next, the receiver 106 executes the transmission section determination process (Step S806). Specifically, the CPU 301 of the receiver 106 executes the transmission section determination program 321. Here, the transmission section determination process will be described with reference to FIGS. 9 and 10.

Figure 9:
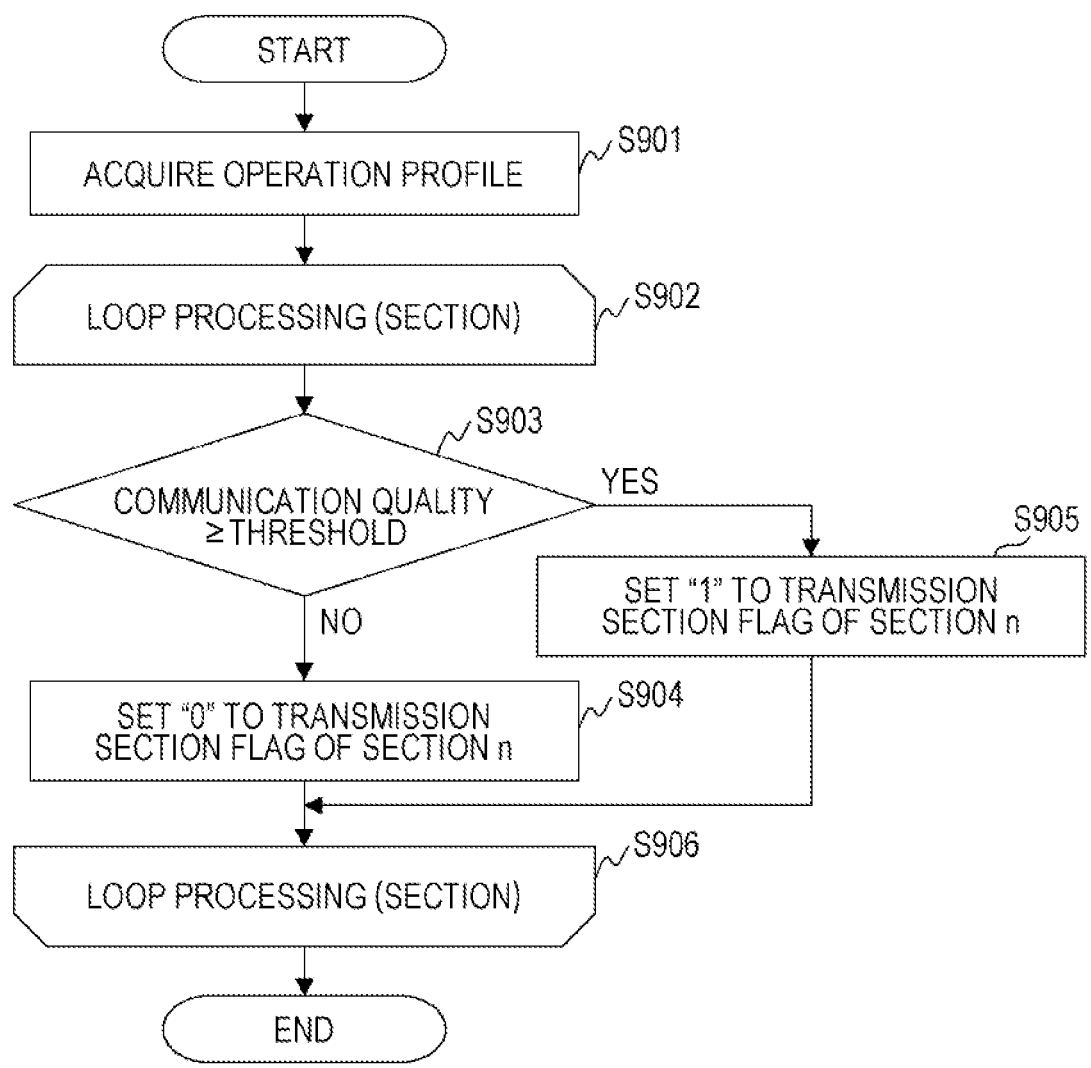
FIG. 9 is a flowchart for explaining an example of a transmission section determination process which is executed by the receiver of the first embodiment.
Figure 10:
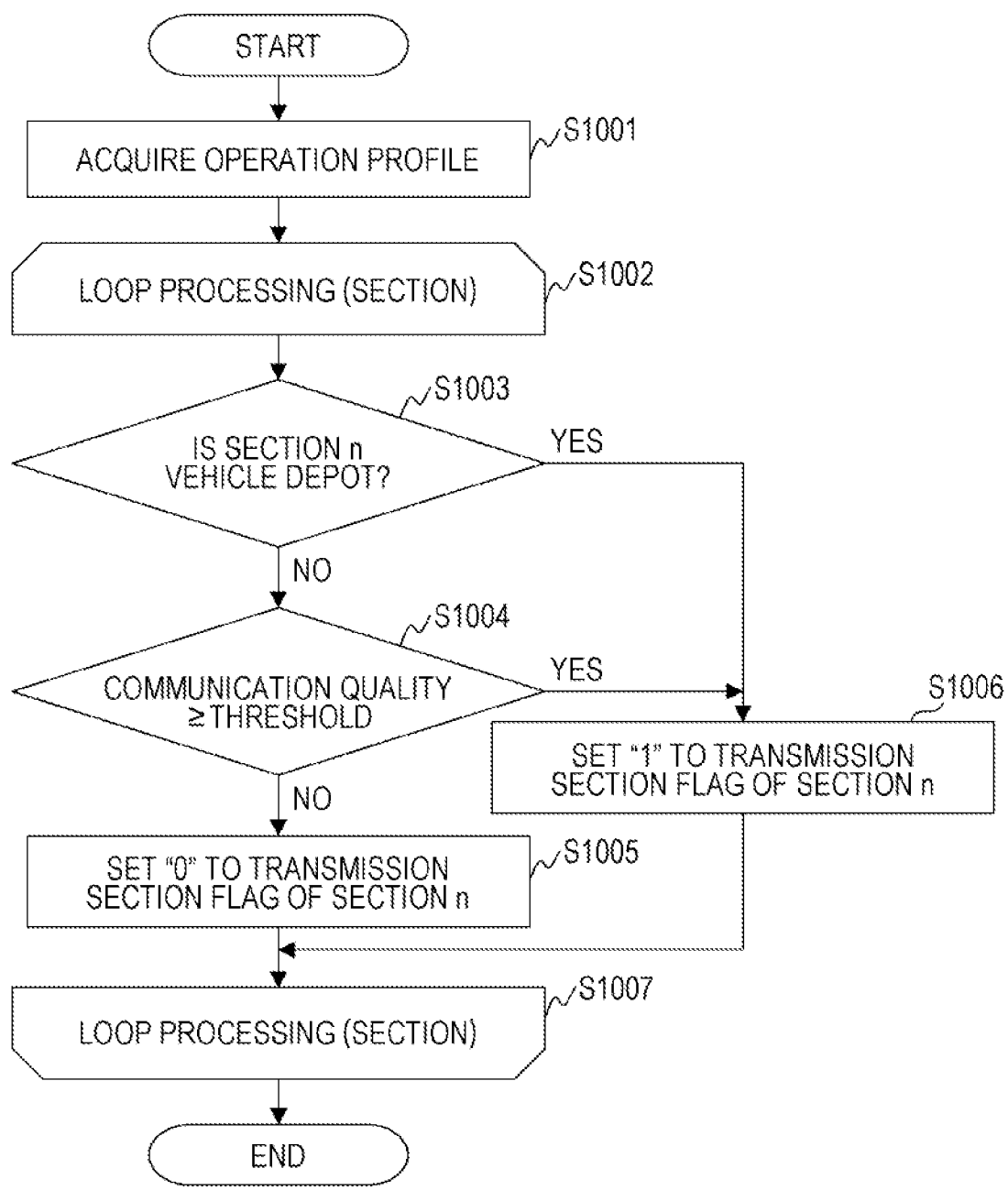
FIG. 10 is a flowchart for explaining an example of the transmission section determination process which is performed by the receiver of the first embodiment.

FIGS. 9 and 10 are flowcharts for explaining an example of the transmission section determination process executed by the receiver 106 of the first embodiment. In the transmission section determination process illustrated in FIG. 9, the transmission section is determined based on the communication quality of each section. In the transmission section determination process illustrated in FIG. 10, the transmission section is determined based on the communication quality and location information of each section.

First, the transmission section determination process of FIG. 9 will be described.

The CPU 301 acquires the operation profile 311 stored in the main storage device 303 (Step S901). At this time, the CPU 301 initializes the transmission section information 313 and sets an initial value "0" in a variable n indicating the section. Specifically, the CPU 301 generates the same number of entries as the number of sections included in the operation profile 311 in the transmission section information 313, and sets the section identification information in the ID 601 of each entry. The variable n is a value from 0 to N−1. N represents the number of entries in the operation profile 311.

Next, the CPU 301 starts loop processing of the section (Step S902). Specifically, the CPU 301 selects the section corresponding to the variable n.

Next, the CPU 301 determines whether or not the communication quality in the section n is equal to or higher than a threshold (Step S903).

For example, the CPU 301 refers to the operation profile 311, calculates the average value of RSRP using RSRP in which the ID 401 is stored in the communication quality 405 of the entries from section n to section n+k, and determines whether or not the average value is equal to or higher than the threshold. Here, k is a parameter for realizing the averaging process for eliminating the instantaneous fluctuation of RSRP, and is an integer of 0 or more. In addition, the threshold is set in advance.

If the communication quality in the section n is smaller than the threshold, the CPU 301 sets the transmission section flag 602 of the entry corresponding to the section n of the transmission section information 313 to "0" (Step S904), and then proceeds to Step S906.

When the communication quality in the section n is equal to or higher than the threshold, the CPU 301 sets the transmission section flag 602 of the entry corresponding to the section n of the transmission section information 313 to "1" (Step S905), and then proceeds to Step S906.

In Step S906, the CPU 301 determines whether or not the processing is completed for all the sections (Step S906). Specifically, it is determined whether or not n matches N−1.

If the processing is not completed for all the sections, the CPU 301 increments the variable n by 1, and then returns to Step S902.

When the processing is completed for all the sections, the CPU 301 ends the transmission section determination process.

In this way, the receiver 106 sets a section in which the communication quality (average value of RSRP) is equal to or higher than the threshold, that is, a section in which there is a margin in the radio bandwidth, as the transmission section. As a result, non-preferred traffic can be transmitted while suppressing the influence on high-priority traffic.

Next, the transmission section determination process of FIG. 10 will be described.

The CPU 301 acquires the operation profile 311 stored in the main storage device 303 (Step S1001). The process of Step S1001 is the same as the process of Step S901.

The CPU 301 starts loop processing of the section (Step S1002). The process of Step S1002 is the same as the process of Step S902.

Next, the CPU 301 determines whether or not the location corresponding to the section n is a vehicle depot (Step S1003).

Specifically, the CPU 301 refers to the operation profile 311 and determines whether or not the information indicating the vehicle depot is stored in the location 404 of the entry corresponding to the section n.

If the location corresponding to the section n is the vehicle depot, the CPU 301 sets the transmission section flag 602 of the entry corresponding to the section n of the transmission section information 313 to "1" (Step S1006), and then proceeds to Step S1007.

When the location corresponding to the section n is not the vehicle depot, the CPU 301 determines whether or not the communication quality in the section n is equal to or higher than the threshold (Step S1004). The process of Step S1004 is the same as the process of Step S903.

If the communication quality in the section n is smaller than the threshold, the CPU 301 sets the transmission section flag 602 of the entry corresponding to the section n of the transmission section information 313 to "0" (Step S1005), and then proceeds to Step S1007.

When the communication quality in the section n is equal to or higher than the threshold, the CPU 301 sets the transmission section flag 602 of the entry corresponding to the section n of the transmission section information 313 to "1" (Step S1006), and then proceeds to Step S1007.

The process of Step S1007 is the same as the process of Step S906.

If the processing is not completed for all the sections, the CPU 301 increments the variable n by 1, and then returns to Step S1002.

When the processing is completed for all the sections, the CPU 301 ends the transmission section determination process.

In this way, the receiver 106 sets the section corresponding to the vehicle depot where the maintenance of the vehicle 104 is performed and the section whose communication quality (average value of RSRP) is equal to or higher than the threshold as the transmission section. By setting the section corresponding to the vehicle depot, which does not need to preferentially transmit the high-priority traffic, to the transmission section, it is possible to efficiently transmit the low-priority traffic.

The above is the description of the transmission section determination process. The description will return to the explanation of FIG. 8.

After the transmission section information 313 is generated, the receiver 106 periodically executes the traffic restriction determination process (Steps S811, S814, and S817), and transmits the traffic control information 211 to the transmitter 101 that transmits the traffic to be controlled as a processing result (Steps S812, S815, and S818). Specifically, the CPU 301 of the receiver 106 executes the traffic restriction determination program 322. Here, the traffic restriction determination process will be described with reference to FIG. 11.

Figure 11:
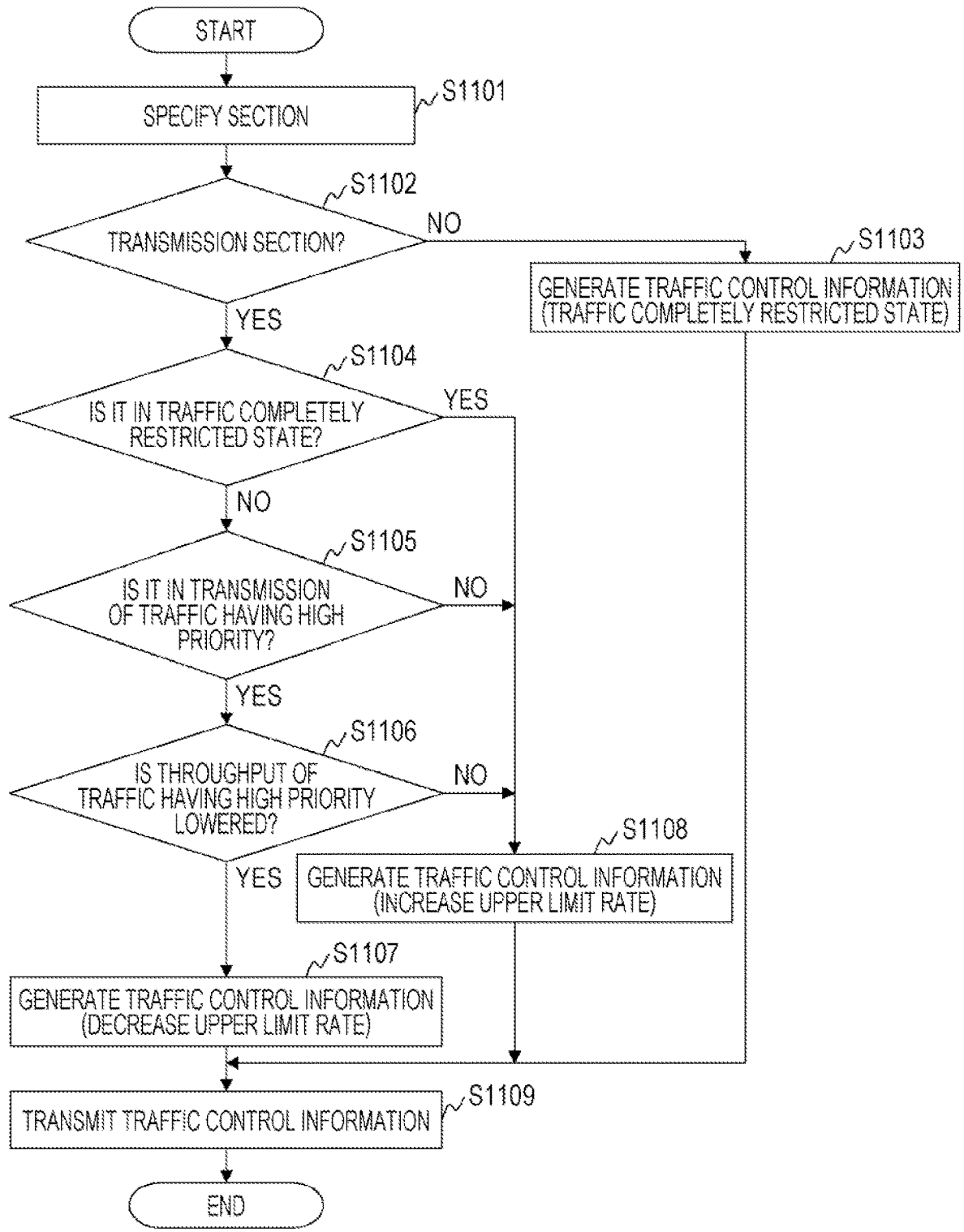
FIG. 11 is a flowchart illustrating an example of a traffic restriction determination process executed by the receiver of the first embodiment.

FIG. 11 is a flowchart for explaining an example of the traffic restriction determination process executed by the receiver 106 of the first embodiment.

The CPU 301 specifies the section where the vehicle 104 is currently located (Step S1101).

For example, the CPU 301 acquires time information or location information from a control unit, a sensor, or the like, and specifies the section in which the vehicle 104 is currently located by comparing it with the time 402 or the location 404 of the operation profile 311.

Next, the CPU 301 refers to the transmission section information 313 and determines whether or not the specified section is a transmission section (Step S1102).

If it is determined that the specified section is not the transmission section, the CPU 301 generates the traffic control information 211 for setting a traffic completely restricted state (Step S1103), and transmits the traffic control information 211 to the transmitter that transmits the traffic to be controlled (Step S1109). After that, the CPU 301 ends the traffic restriction determination process.

Here, the traffic control information 211 in which the priority 701 is set to "non-preferred" and the upper limit rate 702 is set to "0" is generated. The CPU 301 calculates an expiration date based on the current time, and sets the calculated time in the expiration date 703. The traffic completely restricted state represents a state in which the upper limit rate of the traffic to be controlled is controlled to be 0.

When it is determined that the specified section is the transmission section, the CPU 301 determines whether or not the transmitter transmitting the traffic to be controlled is in the traffic completely restricted state (Step S1104).

For example, the CPU 301 determines whether or not the upper limit rate 702 of the traffic control information 211 transmitted last time is 0.

When the transmitter transmitting the traffic to be controlled is in the traffic completely restricted state, the CPU 301 generates the traffic control information 211 for increasing the upper limit rate (Step S1108), and transmits the traffic control information 211 to the transmitter transmitting the traffic to be controlled (Step S1109). After that, the CPU 301 ends the traffic restriction determination process.

Here, the traffic control information 211 in which the priority 701 is set to "non-preferred" and the upper limit rate 702 is set to a value greater than 0 is generated. The CPU 301 calculates an expiration date based on the current time, and sets the calculated time in the expiration date 703. The amount of increase in the upper limit rate may be a constant value or a ratio to the current upper limit rate.

If the transmitter transmitting the traffic to be controlled is not in the traffic completely restricted state, the CPU 301 determines whether or not high-priority traffic is currently being transmitted (Step S1105).

If no high-priority traffic is currently being sent, the CPU 301 generates the traffic control information 211 to increase the upper limit rate (Step S1108), and transmits the traffic control information 211 to the transmitter that transmits the traffic to be controlled (Step S1109). After that, the CPU 301 ends the traffic restriction determination process.

If high-priority traffic is currently being sent, the CPU 301 determines whether or not the high-priority traffic is experiencing reduced throughput (Step S1106). This is a process for determining whether or not the transmission of the traffic to be controlled does not hinder the transmission of the high-priority traffic.

The receiver 106 of the first embodiment periodically measures the throughput of the received traffic, and stores the measurement result in the main storage device 303. The CPU 301 determines whether or not the throughput of the high-priority traffic is decreasing by comparing the latest throughput with the previous throughput in time series. Further, the above determination method is an example, and the invention is not limited thereto.

If the throughput of the high-priority traffic is not reduced, the CPU 301 generates the traffic control information 211 to increase the upper limit rate (Step S1108), and transmits the traffic control information 211 to the transmitter that transmits the traffic to be controlled (Step S1109). After that, the CPU 301 ends the traffic restriction determination process.

If the throughput of the high-priority traffic is reduced, the CPU 301 generates the traffic control information 211 to reduce the upper limit rate (Step S1107), and transmits the traffic control information 211 to the transmitter that transmits the traffic to be controlled (Step S1109). After that, the CPU 301 ends the traffic restriction determination process.

Here, the traffic control information 211 in which the priority 701 is set to "non-preferred" and the upper limit rate 702 is set to a value smaller than the previous upper limit rate is generated. The CPU 301 calculates an expiration date based on the current time, and sets the calculated time in the expiration date 703. The amount of decrease in the upper limit rate may be a constant value or a ratio to the current upper limit rate.

After executing the process of Step S1101, the CPU 301 may determine whether or not the position of the vehicle 104 corresponding to the specified section is the vehicle depot. When the position of the vehicle 104 corresponding to the transmission section is the vehicle depot, the CPU 301 generates the traffic control information 211 in which the upper limit rate 702 is set to a null value or infinity. In this case, the transmitter 101 transmits traffic without executing traffic control. If the position of the vehicle 104 corresponding to the transmission section is not the vehicle depot, the CPU 301 proceeds to Step S1102.

As described above, the receiver 106 controls the transmission of the traffic to be controlled so that the throughput of the high-priority traffic does not decrease in the transmission section. As a result, the influence on the transmission of high-priority traffic can be suppressed.

In the traffic control method using measurement values of the real-time throughput, traffic control is not performed until a decrease in throughput is detected. On the other hand, the traffic control system of the first embodiment controls the upper limit rate of the low-priority traffic while checking the throughput of the high-priority traffic in the transmission section. As a result, it is possible to suppress the influence on the transmission of high-priority traffic as compared with the conventional method.

The above is the description of the traffic restriction determination process. The description will return to the explanation of FIG. 8.

The transmitter 102 to which the traffic control information 211 is not transmitted starts transmitting traffic at an arbitrary timing (Step S813), and ends transmitting traffic at an arbitrary timing (Step S819).

On the other hand, the transmitter 101 to which the traffic control information 211 is transmitted starts transmitting traffic while executing rate control such as traffic shaping based on the traffic control information 211 (Step S816).

In the traffic restriction determination process of Step S811, the receiver 106 determines that the section of the vehicle 104 is not the transmission section, and transmits the traffic control information 211 for setting the traffic completely restricted state to the transmitter 101. In this case, the transmitter 101 controls the traffic rate to be 0. That is, no traffic is transmitted from the transmitter 101.

In the traffic restriction determination process of Step S814, the receiver 106 transmits the traffic control information 211 for increasing the upper limit rate to the transmitter 101 because the section of the vehicle 104 is the transmission section and is in the traffic completely restricted state.

For example, the traffic control information 211 whose upper limit rate 702 is set to "1 Mbps" is transmitted. In this case, the transmitter 101 transmits the traffic while limiting the upper limit rate to 1 Mbps.

In the traffic restriction determination process of Step S814, the receiver 106 determines whether or not the throughput of the traffic is reduced because the section of the vehicle 104 is the transmission section and the high-priority traffic is being transmitted. If it is determined that the traffic throughput has not decreased, the receiver 106 transmits the traffic control information 211 for increasing the upper limit rate to the transmitter 101.

For example, the traffic control information 211 whose upper limit rate 702 is set to "2 Mbps" is transmitted. In this case, the transmitter 101 transmits the traffic while limiting the upper limit rate to 2 Mbps.

Although the traffic control is performed by the transmitter 101, the receiver 106 may perform the traffic control. For example, the receiver 106 adjusts the upper limit rate by TCP reception window control. In this case, the receiver 106 stores the traffic control information 211 in the main storage device 303 without transmitting it to the transmitter.

According to the first embodiment, in a communication environment capable of receiving a plurality of types of traffic, it is possible to realize traffic control that does not hinder the transmission of high-priority traffic according to the operation of the vehicle 104.

Second Embodiment

In a second embodiment, the receiver 106 monitors the communication quality of the vehicle 104 during operation in real time, and controls the transmission of traffic in consideration of the real-time communication quality. Hereinafter, the second embodiment will be described focusing on the difference from the first embodiment.

The configuration of the traffic control system of the second embodiment is the same as the configuration of the first embodiment. The configurations of the transmitters 101 and 102 and the receiver 106 of the second embodiment are the same as the configurations of the first embodiment. The processing flow of the traffic control system of the second embodiment is the same as the processing flow of the first embodiment. The transmission section determination process of the second embodiment is the same as the process of the first embodiment.

Figure 12:
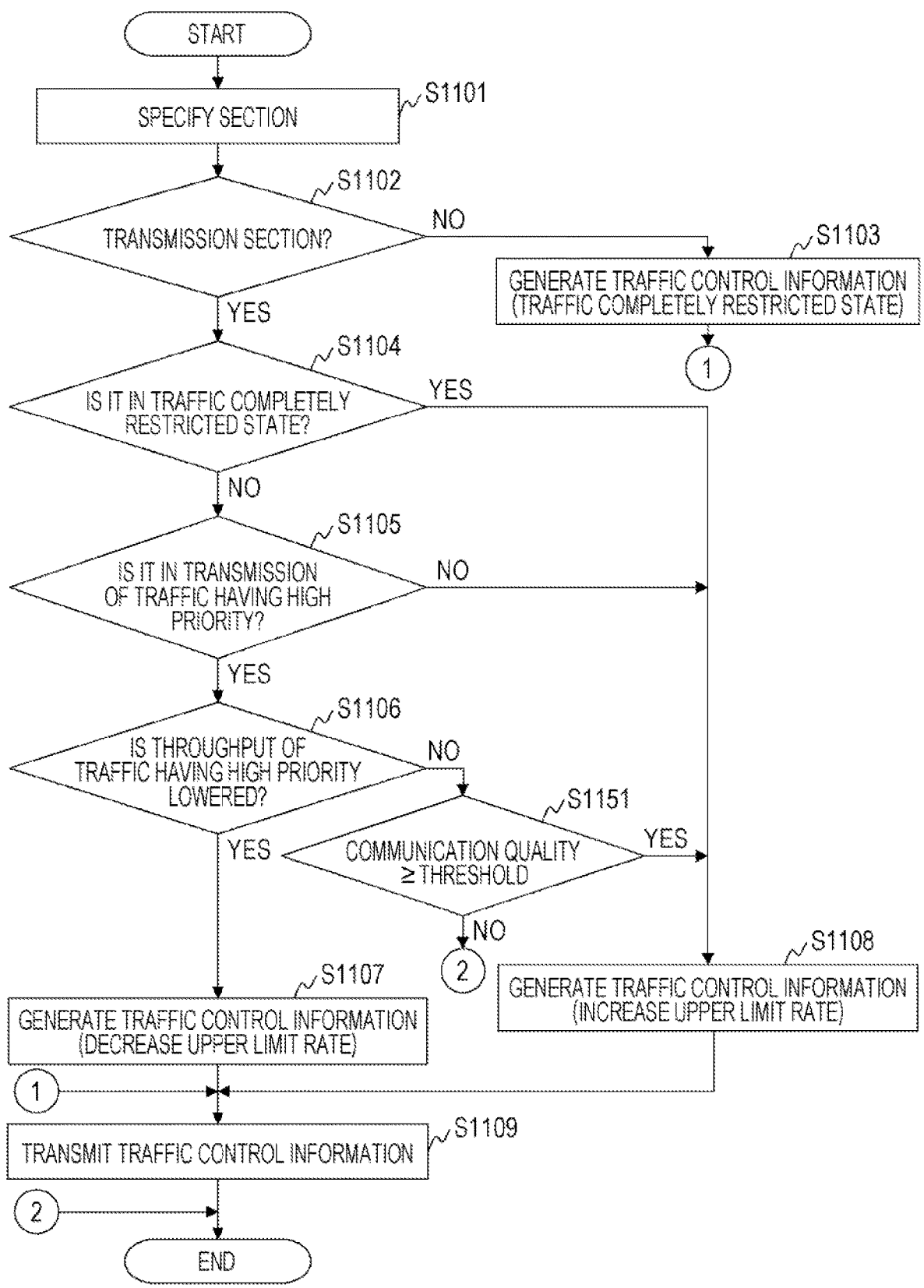
FIG. 12 is a flowchart illustrating an example of a traffic restriction determination process executed by the receiver of a second embodiment.

The traffic restriction determination process of the second embodiment is partially different from the process of the first embodiment. FIG. 12 is a flowchart for explaining an example of the traffic restriction determination process executed by the receiver 106 of the second embodiment.

In Step S1106, if the throughput of the high-priority traffic is not reduced, the CPU 301 determines whether or not the current communication quality is equal to or higher than a threshold (Step S1151).

For example, the CPU 301 calculates the current RSRP and determines whether or not the RSRP is equal to or higher than the threshold. The threshold is set in advance. The threshold may be the same as or different from the threshold used in the transmission section determination process.

If the current communication quality is equal to or higher than the threshold, the CPU 301 proceeds to Step S1108. If the current communication quality is less than the threshold, the CPU 301 ends the traffic restriction determination process.

Since the other processes are the same as those in the first embodiment, detailed description thereof will be omitted.

In the traffic restriction determination process of the second embodiment, the upper limit rate is set in consideration of the real-time communication quality even in the transmission section. By performing the traffic control according to the communication quality that fluctuates from moment to moment, the influence of the throughput of the high-priority traffic can be further suppressed.

As described above, according to the second embodiment, in a communication environment capable of receiving a plurality of types of traffic, it is possible to realize traffic control that does not hinder the delivery of high-priority traffic according to the operation of the vehicle 104 and the real-time communication quality.

Third Embodiment

In a third embodiment, traffic control using the information acquired in real time is realized without using the operation profile 311 and the transmission section information 313. Hereinafter, the third embodiment will be described focusing on the difference from the first embodiment.

The configuration of the traffic control system of the third embodiment is the same as the configuration of the first embodiment. The configurations of the transmitters 101 and 102 of the third embodiment are the same as the configurations of the first embodiment. The hardware configuration of the receiver 106 of the third embodiment is the same as that of the first embodiment. The third embodiment is different from the first embodiment in that the receiver 106 does not hold the operation profile 311 and the transmission section information 313.

Further, in the third embodiment, the receiver 106 manages a transmission flag. The transmission flag is a flag indicating that high-priority traffic is being transmitted. When the transmission flag is "1", it indicates that high-priority traffic is being transmitted, and when the transmission flag is "0", it indicates that high-priority traffic is not being transmitted. The initial value of the transmission flag is set to "0".

When the receiver 106 detects the reception of high-priority traffic, it determines whether or not the transmission flag is "0". When the transmission flag is "0", the receiver 106 updates the transmission flag to "1". Further, when the receiver 106 detects the end of transmission of the high-priority traffic, it determines whether or not the transmission flag is "1". When the transmission flag is "1", the receiver 106 updates the transmission flag to "0".

The processing flow of the traffic control system of the third embodiment is partially different from the processing flow of the first embodiment. Specifically, in the third embodiment, the receiver 106 does not generate the operation profile 311. Further, in the third embodiment, the receiver 106 does not execute the transmission section determination process.

Figure 13:
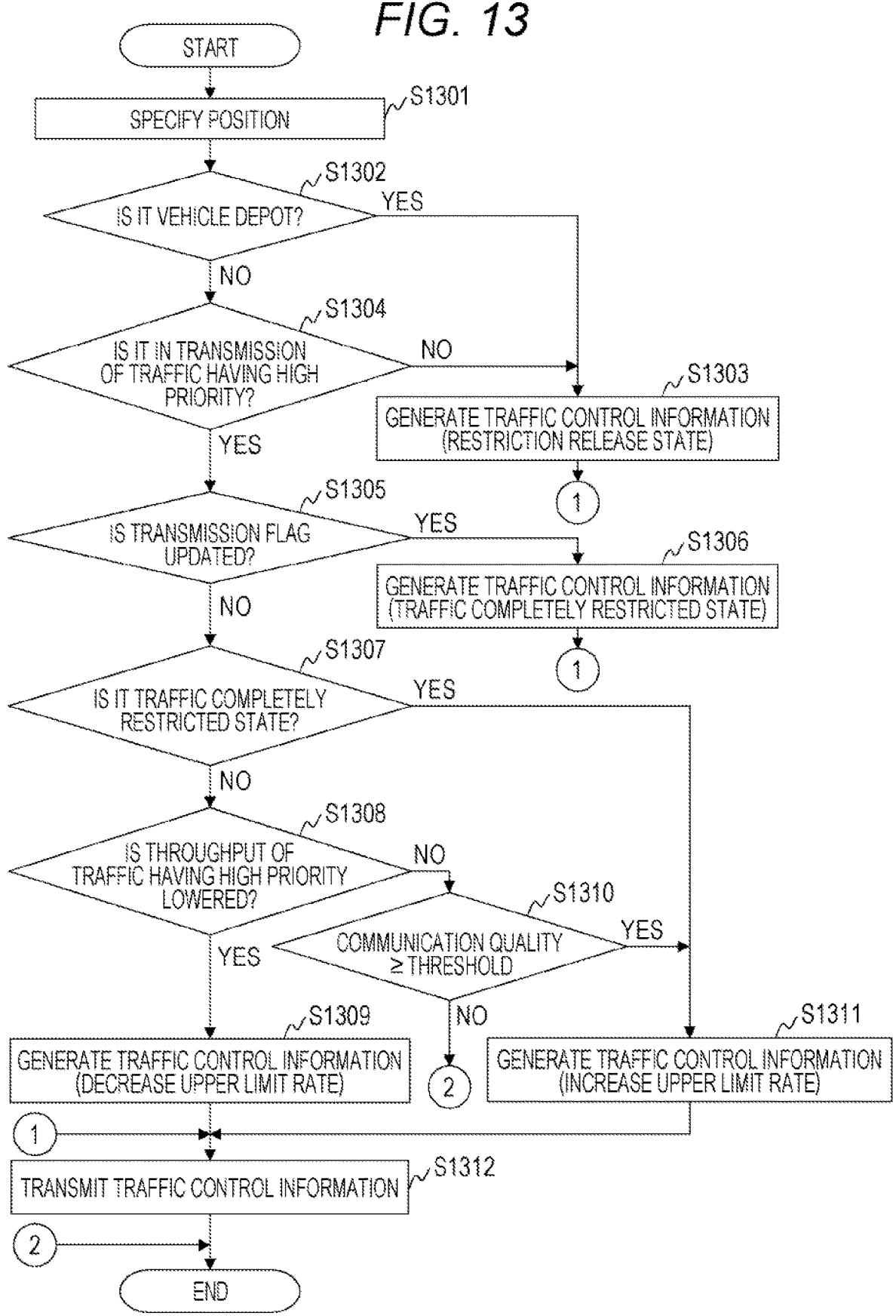
FIG. 13 is a flowchart for explaining an example of a traffic restriction determination process executed by a receiver of a third embodiment.

The traffic restriction determination process of the third embodiment is different from that of the first embodiment. FIG. 13 is a flowchart for explaining an example of the traffic restriction determination process executed by the receiver 106 of the third embodiment.

The CPU 301 specifies the current position of the vehicle 104 (Step S1301).

For example, the CPU 301 specifies the current position of the vehicle 104 based on the location information acquired from the control unit, the sensor, and the like.

Next, the CPU 301 determines whether or not the vehicle 104 is at the vehicle depot (Step S1302).

For example, the CPU 301 determines whether or not the vehicle 104 is at the vehicle depot by comparing the location information of the vehicle 104 with the map information.

When the vehicle 104 is at the vehicle depot, the CPU 301 generates the traffic control information 211 for setting a restriction release state (Step S1303), and transmits the traffic control information 211 to the transmitter that transmits the traffic to be controlled (Step S1312). After that, the CPU 301 ends the traffic restriction determination process.

Here, the traffic control information 211 in which the priority 701 is set to "non-preferred" and the upper limit rate 702 is set to a null value or infinity is generated. The CPU 301 calculates an expiration date based on the current time, and sets the calculated time in the expiration date 703. The restriction release state represents a state in which the upper limit rate of the traffic to be controlled is not set.

If the vehicle 104 is not at the vehicle depot, the CPU 301 determines whether or not high-priority traffic is currently being transmitted (Step S1304). The process of Step S1304 is the same as the process of Step S1105. The CPU 301 may execute the determination using the transmission flag.

If no high-priority traffic is currently being transmitted, the CPU 301 generates the traffic control information 211 to set the restriction release state (Step S1303) and transmits the traffic control information 211 to the transmitter that transmits the traffic to be controlled (Step S1312). After that, the CPU 301 ends the traffic restriction determination process.

If high-priority traffic is currently being transmitted, the CPU 301 determines whether or not the transmission flag has been updated from 0 to 1 (Step S1305). The fact that the transmission flag is updated from 0 to 1 indicates that the transmission of high-priority traffic has been started between the end of the previous traffic restriction determination process and the start of the current traffic restriction determination process.

When the transmission flag is updated from 0 to 1, the CPU 301 generates the traffic control information 211 to set the traffic completely restricted state (Step S1306), and transmits traffic control information 211 to the transmitter that transmits the traffic to be controlled (Step S1312). After that, the CPU 301 ends the traffic restriction determination process.

The process of Step S1306 is the same as the process of Step S1103.

If the transmission flag has not been updated from 0 to 1, the CPU 301 determines whether or not the transmitter transmitting the traffic to be controlled is in the traffic completely restricted state (Step S1307).

The process of Step S1307 is the same as the process of Step S1104.

When the transmitter transmitting the traffic to be controlled is in the traffic completely restricted state, the CPU 301 generates the traffic control information 211 for increasing the upper limit rate (Step S1311), and transmits the traffic control information 211 to the transmitter that transmits the traffic to be controlled (Step S1312). After that, the CPU 301 ends the traffic restriction determination process.

The process of Step S1311 is the same as the process of Step S1108.

If the transmitter transmitting the traffic to be controlled is not in a traffic completely restricted state, the CPU 301 determines whether or not the throughput of the high-priority traffic is reduced (Step S1308).

The process of Step S1308 is the same as the process of Step S1106.

If the throughput of the high-priority traffic is low, the CPU 301 generates the traffic control information 211 to reduce the upper limit rate (Step S1309), and transmits the traffic control information 211 to the transmitter that transmits the traffic to be controlled (Step S1312). After that, the CPU 301 ends the traffic restriction determination process.

The process of Step S1309 is the same as the process of Step S1107.

If the throughput of the high-priority traffic is not reduced, the CPU 301 determines whether or not the current communication quality is equal to or higher than the threshold (Step S1310).

The process of Step S1310 is the same as the process of Step S1151.

When the current communication quality is equal to or higher than the threshold, the CPU 301 generates the traffic control information 211 for increasing the upper limit rate (Step S1311), and transmits the traffic control information 211 to the transmitter that transmits the traffic to be controlled (Step S1312). After that, the CPU 301 ends the traffic restriction determination process.

If the current communication quality is less than the threshold, the CPU 301 ends the traffic restriction determination process.

According to the third embodiment, traffic control using information acquired in real time is realized in a communication environment in which a plurality of types of traffic can be received. It has the advantage of being able to handle cases where the route is not fixed or where the operating conditions fluctuate depending on the day.

Further, the invention is not limited to the embodiments described above, but includes various modifications. In addition, for example, the embodiments have been described about the configuration in detail in order to help with understanding on the invention, but the invention is not limited to the one equipped with all the configurations. In addition, some of the configurations of each embodiment may be added, deleted, or replaced with respect to the other configurations.

Each of the above configurations, functions, processing units, processing means, and the like may be partially or entirely achieved by hardware by, for example, designing by an integrated circuit. In addition, the invention may be realized by a software program code which realizes the functions of the embodiments. In this case, a recording medium recorded with the program code is provided to a computer, and a processor of the computer reads out the program code stored in the recording medium. In this case, the program code itself read out of the recording medium is used to realize the functions of the above embodiments. The program code itself and the recording medium storing the program code are configured in the invention. As a recording medium to supply such a program code, for example, there are a flexible disk, a CD-ROM, a DVD-ROM, a hard disk, a Solid State Drive (SSD), an optical disk, a magneto-optical disk, a CD-R, a magnetic tape, a nonvolatile memory card, and a ROM.

In addition, the program code to realize the functions of this embodiment may be embedded by a wide program such as assembler, C/C++, perl, Shell, PHP, Python, Java (registered trademark) or a script language.

Further, the software program code to realize the functions of the embodiment is distributed through a network, and stored in a recording unit such as a hard disk and a memory of the computer or a recording medium such as a CD-RW and a CD-R. The processor provided in the computer may read and perform the program code stored in the recording unit or the recording medium.

In the above embodiments, only control lines and information lines considered to be necessary for explanation are illustrated, but not all the control lines and the information lines for a product are illustrated. All the configurations may be connected to each other.

What is claimed is:

1. A traffic control method executed by a receiver that is mounted in a vehicle moving on an arbitrary route, and can receive a plurality of types of traffic having different priorities,
wherein the receiver is configured to
include an arithmetic device, a storage device connected to the arithmetic device, and a network interface connected to the arithmetic device, and
manage an operation profile that stores data in which a section that is a part of the route and a communication quality in the section are associated,
wherein a first traffic and a second traffic having a lower priority than the first traffic can be received,
wherein the traffic control method comprises:
determining, by the receiver referring the operation profile, the section having a good communication quality to a transmission section in which the second traffic can be transmitted;
executing a traffic restriction determination process in which the receiver generates control information for controlling transmission of the second traffic,
wherein the traffic restriction determination process includes generating, by the receiver, first control information for controlling transmission of the second traffic not to hinder transmission of the first traffic when the vehicle is located in the transmission section,
wherein the data stored in the operation profile includes time as information for designating the section, and
wherein the traffic restriction determination process includes generating, by the receiver, second control information for controlling not to transmit the second traffic when the vehicle is located in a section other than the transmission section; and
transmitting the first control information and the second control information to a transmitter transmitting the second traffic.

2. The traffic control method according to claim 1, wherein the generating includes:
measuring, by the receiver, a current communication quality; and
generating, by the receiver, the first control information for increasing an upper limit rate of the second traffic when the current communication quality is equal to or higher than a threshold.

3. The traffic control method according to claim 1, wherein the generating includes generating, by the receiver, the first control information for increasing an upper limit rate of the second traffic when the first traffic is not transmitted.

4. The traffic control method according to claim 1, wherein the generating includes:
measuring, by the receiver, a throughput of the first traffic in a current transmission when the first traffic and the second traffic are transmitted; and
generating, by the receiver, the first control information for reducing an upper limit rate of the second traffic when it is detected that the throughput of the first traffic is lowered.

5. The traffic control method according to claim 1, wherein the traffic restriction determination process includes generating, by the receiver, the first control information for controlling so that an upper limit rate of the second traffic is not restricted when the vehicle is located in a section corresponding to a place where maintenance is performed.

6. The traffic control method according to claim 1, wherein the executing includes executing, by the receiver, the traffic restriction determination process periodically.

7. The traffic control method according to claim 1, wherein the data stored in the operation profile further includes position as the information for designating the section.

8. A receiver that is mounted on a vehicle moving on an arbitrary route and can receive a plurality of types of traffic having different priorities, comprising:
an arithmetic device;
a storage device connected to the arithmetic device; and
a network interface that connects to the arithmetic device,
wherein a first transmitter for transmitting a first traffic and a second transmitter for transmitting a second traffic having a lower priority than the first traffic are connected to the receiver via the network interface,
wherein the storage device stores an operation profile that stores data in which a section that is a part of the route and a communication quality in the section are associated,
wherein the arithmetic device is configured to:
determine a section having a good communication quality with reference to the operation profile to a transmission section in which the second traffic can be transmitted;

generate first control information for controlling transmission of the second traffic not to hinder transmission of the first traffic when the vehicle is located in the transmission section; and generate second control information for controlling so that the second traffic is not transmitted when the vehicle is located in a section other than the transmission section; and transmit the first control information and the second control information to the second transmitter, and wherein the data stored in the operation profile includes time as information for designating the section.

9. The receiver according to claim 8, wherein the arithmetic device is configured to:

measure a current communication quality when the vehicle is located in the transmission section; and generate the first control information for increasing an upper limit rate of the second traffic when the current communication quality is equal to or higher than a threshold.

10. The receiver according to claim 8, wherein the arithmetic device is configured to:

determine whether or not the first traffic is transmitted when the vehicle is located in the transmission section; and generate the first control information for increasing an upper limit rate of the second traffic when the first traffic is not transmitted.

11. The receiver according to claim 8, wherein the arithmetic device is configured to:

measure a throughput of the first traffic in a current transmission when the vehicle is located in the transmission section and the first traffic and the second traffic are transmitted; and generate the first control information for reducing an upper limit rate of the second traffic when it is detected that the throughput of the first traffic is lowered.

12. The receiver according to claim 8, wherein the arithmetic device generates third control information for controlling so that an upper limit rate of the second traffic is not restricted when the vehicle is located in a section corresponding to a place where maintenance is performed.

13. The receiver according to claim 8, wherein the data stored in the operation profile further includes position as the information for designating the section.

14. A communication system, comprising:

a vehicle that moves on an arbitrary route and includes a receiver for receiving traffic; and a plurality of communication devices that transmit the traffic, wherein the plurality of communication devices include a first communication device for transmitting a first traffic and a second communication device for transmitting a second traffic having a lower priority than the first traffic, wherein the receiver includes:

a storage unit that stores an operation profile that stores data in which a section that is a part of the route and a communication quality in the section are associated;

a transmission section determination unit that determines the section having a good communication quality to a transmission section, where the second traffic can be transmitted, with reference to the operation profile; and a determination unit that generates first control information for controlling transmission of the second traffic and transmits the first control information to the plurality of communication devices, wherein the determination unit is configured to:

generate the first control information for controlling transmission of the second traffic not to hinder transmission of the first traffic when the vehicle is located in the transmission section, and transmit the control information to the second communication device; and generate second control information for controlling so that the second traffic is not transmitted when the vehicle is located in a section other than the transmission section, and transmit the second control information to the second communication device, and wherein the data stored in the operation profile includes time as information for designating the section.

* * * * *